United States Patent
Morimoto

(10) Patent No.: US 6,613,561 B1
(45) Date of Patent: Sep. 2, 2003

(54) HIGH-DENSITY CAPILLARY ARRAY FOR REACTION AND DETECTION OF FLUID

(75) Inventor: Nobuhiko Morimoto, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 124 days.

(21) Appl. No.: 09/718,534

(22) Filed: Nov. 22, 2000

(30) Foreign Application Priority Data

Nov. 26, 1999 (JP) ............................................ 11-336285
Nov. 26, 1999 (JP) ............................................ 11-336289

(51) Int. Cl.[7] .............................................. C12M 1/34
(52) U.S. Cl. .............................. 435/287.2; 435/288.3; 435/288.5
(58) Field of Search ................. 422/68.1, 102; 435/287.2, 288.3, 288.4, 288.5, 288.7

(56) References Cited

U.S. PATENT DOCUMENTS 5,607,646 A    3/1997   Okano et al. ................ 422/101
6,143,152 A  * 11/2000  Simpson et al. ............. 204/451
6,379,974 B1 *  4/2002  Parce et al. ................. 204/600

FOREIGN PATENT DOCUMENTS

| JP | 5-317030 | 12/1993 |
|----|----------|---------|
| JP | 7-506258 | 7/1995 |
| JP | 7-508928 | 10/1995 |
| JP | 10-185922 | 7/1998 |
| JP | 11-75812 | 3/1999 |

* cited by examiner

Primary Examiner—David A. Redding
(74) Attorney, Agent, or Firm—Scully, Scott, Murphy & Presser

(57) ABSTRACT

A high-density capillary array for reaction and detection of fluid, comprising a plurality of fluid processing capillaries arranged in parallel on one same plane, the fluid processing capillaries each comprising a reaction part for performing processing on fluid, connection parts connected to each end portion of the reaction part, and opening portions provided at ends of the connection parts, for allowing the fluid to flow into and out of the reaction part, wherein each of the fluid processing capillaries is bent at portions between the reaction part and the connection parts.

8 Claims, 7 Drawing Sheets

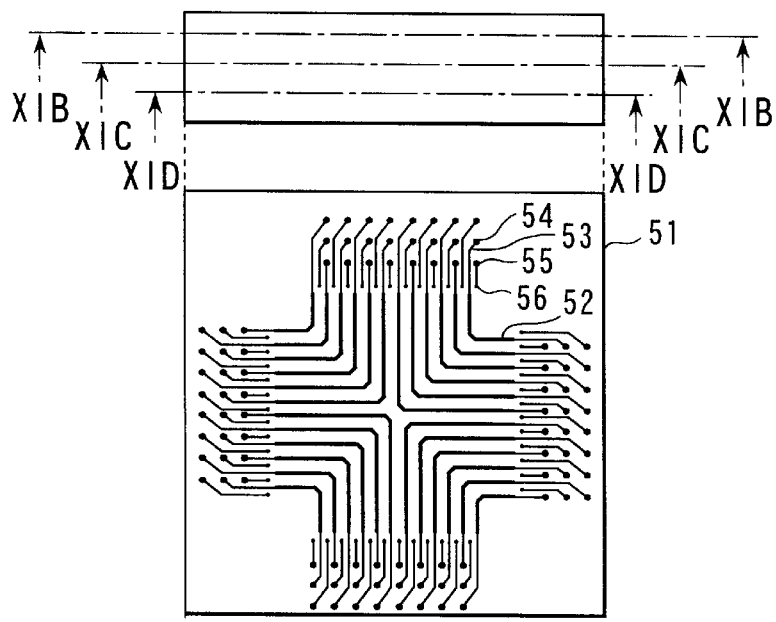
FIG. 11A
FIG. 11B
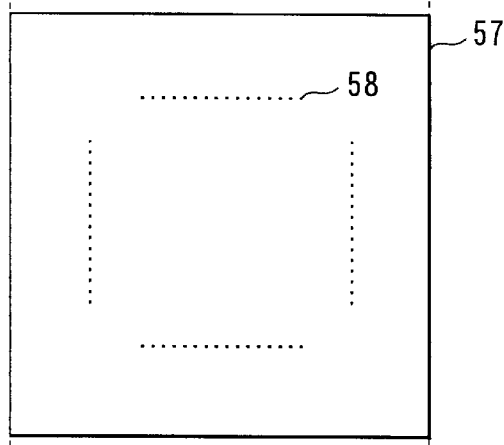
FIG. 11C
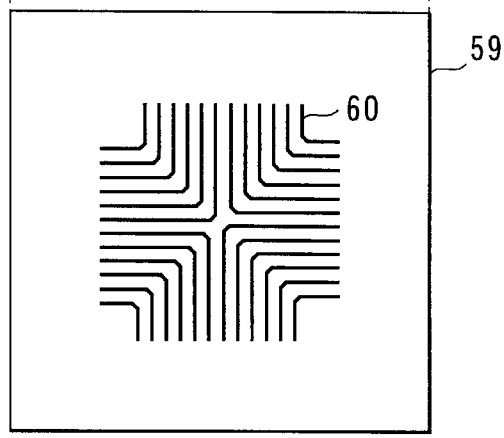
FIG. 11D

HIGH-DENSITY CAPILLARY ARRAY FOR REACTION AND DETECTION OF FLUID

CROSS-REFERENCE TO RELATED APPLICATIONS

This application is based upon and claims the benefit of priority from the prior Japanese Patent Applications No. 11-336285, filed Nov. 26, 1999; and No. 11-336289, filed Nov. 26, 1999, the entire contents of which are incorporated herein by reference.

BACKGROUND OF THE INVENTION

At present, many reaction vessels having a very small capacity are developed for use to amplify or detect DNA or the like. To deal with a large number of samples, it is preferred that many samples can be processed at once and that the costs are lower. Therefore, the vessel preferably has a capacity which is as small as possible.

In recent years, proposals have been made for use of a micro chamber formed on a silicon or glass wafer by a semiconductor process technique, as a micro-capacity vessel. This kind of reaction vessel with a micro capacity is formed in a silicon wafer or glass which has a diameter of about 4 inches. For example, Jan. Pat. Appln. KOKAI Publication No. 5-317030 discloses a biochemical reaction apparatus which comprises a plurality of micro chambers. This apparatus is capable of treating simultaneously samples of small amounts under various reaction conditions. However, the apparatus is not intended to make detection after completion of reactions.

Japanese Patent Application KOKAI Publications No. 11-75812 and 10-18922 each disclose a tube-like reaction vessel in which a nucleic acid probe is internally immobilized to detect DNA. To use this vessel, a sample containing single-stranded DNA labeled with a fluorescent material is added to the vessel, and subsequently, hybridization reaction is performed, thereby to detect DNA having a specific base sequence. In general, a large number of reaction vessels are integrated and arrayed in this kind of apparatus. Further, all the reaction vessels are arranged on one same plane so that optical observation can be performed advantageously. However, in this apparatus, the number of reaction vessels that can be integrated is limited. In case of arranging reaction vessels in one same plane, a problem arises in that the shape is complicated due to integration. If the shape is complicated, it is difficult to make simple detection such as scanning with use of a linear optical sensor. It may be necessary to carry out complicated image processing continuously after detection. Besides, the flow of liquid can be deteriorated with higher possibility as the shape is complicated more. As the number of bending parts increases more, clogging of the tube is caused more frequently.

On the other hand, samples before an experiment are maintained on a plate having 96 or 384 wells. As a means for transferring sample liquids from the plate to a reaction vessel, a multiple pipette is used. Therefore, the interval between sample wells is desirably set to a value defined by multiplying 9 mm, which is an interval between wells in a plate having 96 wells, by a fraction of an integer. However, an interval of 4.5 mm is maintained if it defined by multiplying 9 mm by ½. Therefore, if sample-introducing holes having this interval are designed for a micro chamber, the inflow and outflow ports occupies the most part of the surface area on a silicon wafer having a diameter of about 4 inches. Consequently, it is difficult to integrate a large number of reaction vessels with a high density.

BRIEF SUMMARY OF THE INVENTION

The present invention relates to an apparatus in which a large number of samples can cause reaction and optical detection can be carried out.

According to the present invention, there is provided a high-density capillary array for reaction and detection of fluid, comprising a plurality of fluid processing capillaries arranged in parallel on one same plane, the fluid processing capillaries each comprising: a reaction part for performing processing on fluid; connection parts connected to each end portion of the reaction part; and opening portions provided at ends of the connection parts, for allowing the fluid to flow into and out of the reaction part, wherein each of the fluid processing capillaries is bent at portions between the reaction part and the connection parts.

An object of the present invention is to provide a reaction apparatus comprising a greater number of reaction vessels, and particularly, a reaction apparatus in which reaction parts are arrayed at a high density in order to carry out reaction and detection advantageously. This object can be achieved by: arranging each reaction vessel to have a capillary shape; constructing a capillary array by integrating reaction parts of the vessels at a high density; and using a light-transmissible member for at least one part. In this manner, the inside of the fluid processing capillaries according to the present invention can be observed optically. During detection, the reaction parts substantially behave as detector parts. The high-density integration described above can be achieved by providing the reaction parts concentrated on the center, and by providing inflow and outflow ports for fluid at a peripheral part of the apparatus. Since the reaction parts are concentrated on the center, conditions of the reaction parts such as temperature and the like can be managed easily. Also, in case where detection is carried out in the reaction parts, the scanning range is advantageously narrow since the reaction parts are concentrated on the center. Narrowing the measurement range can repress harmful influences on optical measurement results from deformation of the apparatus. Besides, the processed shapes can be managed uniformly when manufacturing the present apparatus.

Further, according to the present invention, there is provided a high-density capillary array for reaction and detection of fluid, comprising a plurality of groups of fluid processing capillaries arranged in parallel on one same plane, the fluid processing capillaries each comprising: a reaction part for performing processing on fluid; connection parts connected to both end portions of the reaction part; and opening portions provided at ends of the connection parts, for allowing the fluid to flow into and out of the reaction part, wherein each of the groups of fluid processing capillaries is bent at least one portion, and the groups of fluid processing capillaries are arranged such that corner portions confront bent face back to back each other.

In the present invention, each of groups of capillaries is bent at least one portion of the reaction parts, and the capillaries are arranged such that the corner portions confront bent face back to back each other. It is therefore possible to array much more capillaries within a small area. Thus, a further another object of the present invention is to provide a micro reaction apparatus comprising much more reaction vessels.

If much more reaction vessels are provided in one conventional apparatus, the shape of each reaction vessel tends to be complicated. As a result of this complication, there is a possibility that fluid is insufficiently filled into the vessels.

Hence, the present invention further has an object of providing a reaction apparatus in which the shape of each reaction vessel is much simpler so that samples can be let flow in and out smoothly. This object can be achieved by: constructing the capillary array with the shape of each vessel arranged to have a capillary shape; bending capillaries, which are included in the array, at least one portion; and arranging the capillaries such that the corner portions confront bent face back to back each other. For example, liquid having a high viscosity can be easily let flow in and out by adopting the shape according to the present invention.

Further another object of the present invention is to provide a reaction vessel capable of advantageously carrying out processing on a large number of samples with use of a multiple pipette. If a large number of capillaries are integrated at a high density, the inflow and outflow ports tend to concentrate in accordance with the high-density integration. Therefore, the object is achieved by providing the inflow and outflow ports at peripheral parts of the apparatus and by designing the apparatus particularly in consideration of use of a multiple pipette. Since a general-purpose multiple pipette can be used, the present invention can raise the operation efficiency. If conventional techniques are used, it is necessary to replace or wash tips of the multiple pipette when it is desired that samples should be added through inflow ports of reaction vessels from a multi-wells plate by a multiple pipette and liquid should be moved to another or the original multi-wells plate through outflow ports of the vessels after reaction. This is because different liquid enters into the tips. If the liquid which enters into the tips is changed, consecutive numbers in the column direction on the multi-wells plate are also changed. In the capillary array according to the present invention, excellent correspondence is maintained between the inflow and outflow ports, and a measure for minimizing difference in volume between the capillaries is provided. Accordingly, the present invention is advantageous for use of a multiple pipette.

The term of "fluid" used in the present specification means liquid and gas.

The term of "capillary" also used in the present specification means a tubular vessel which has two opening portions and comprises a reaction part, connection parts, and opening portions. The "reaction" used herein means any reaction such as chemical or bio-chemical reaction, various detection such as optical detection or the like, and chemical or physical processing such as heating, cooling, or the like.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11A is a side view showing a high-density capillary array for reaction and detection of fluid according to a eighth preferred embodiment, and FIGS. 11B to 11D are respectively cross-sectional views cut along lines XIB—XIB, XIC—XIC, and XID—XID.

DETAILED DESCRIPTION OF THE INVENTION

In the following, preferred embodiments of the present invention will be explained in details with reference to the drawings. However, these embodiments merely exemplify the present invention but do not limit the invention as will be easily obvious for persons in the art.

Embodiment 1

The first embodiment of the high-density capillary array for reaction and detection of fluid (which will be hereinafter called a present apparatus) according to the present invention uses a silicon wafer as a lower substrate. Capillaries are manufactured in a manner in which grooves are formed in the lower substrate by etching and a light-transmissible upper substrate is joined to the lower substrate, with opening portions for inflow and outflow of samples formed at desired position of the upper substrate. The opening portions need not always be provided in the upper substrate but may be formed in the lower substrate.

Figure 1A:
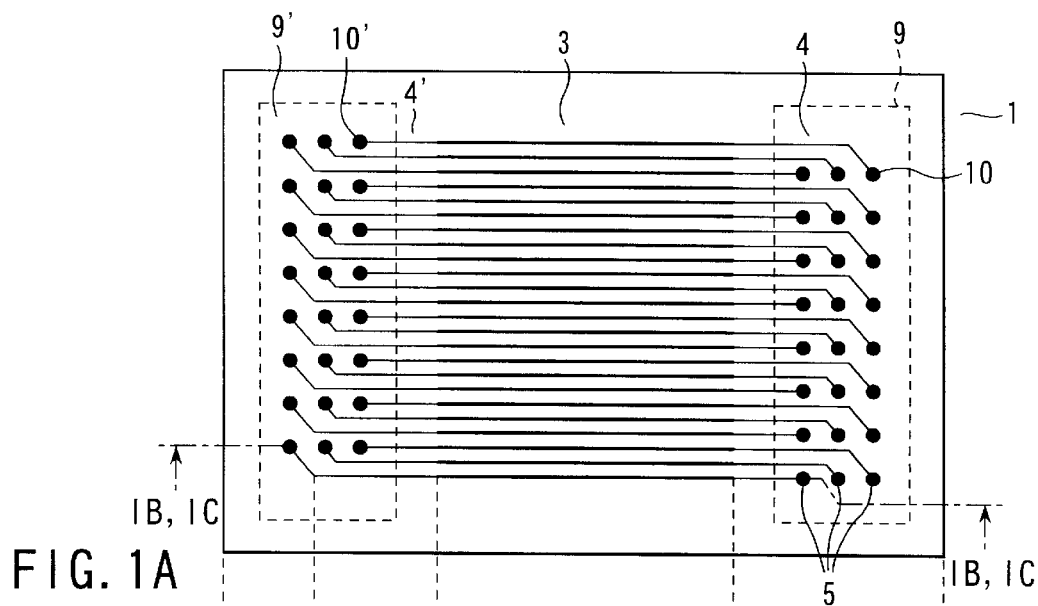
FIG. 1A is a plan view showing a high-density capillary array for reaction and detection of fluid according to a first preferred embodiment.

As shown in FIG. 1A, the embodiment 1 is an apparatus constructed by a silicon wafer 1 comprising reaction parts 3, connection parts 4 and 4', and opening portions 10 and 10'. The reaction parts 3 are constructed by a plurality of linear capillaries arranged in parallel.

Figure 1B:
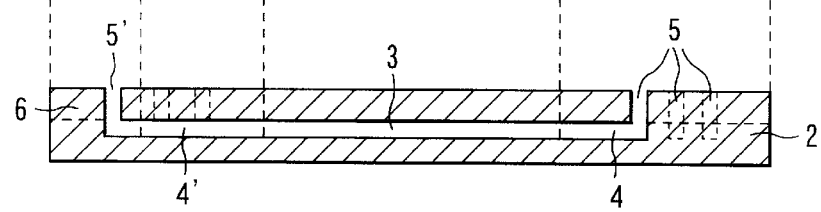
FIGS. 1B and 1C are cross-sectional views cut along a line 1B—1B, or 1C—1C each showing a capillary included in the high-density capillary array for reaction and detection of fluid.

As shown in FIG. 1B, each fluid processing capillary comprises a reaction part 3 where reaction is made internally, the connection parts 4 connected to both end portions of the reaction part 3, and opening portions 5 formed in the upper substrate 6 so as to be continuous to the connection parts 4. Fluids such as samples or the like are let flow in from the opening portions 5 formed in the upper substrate 6 and reach the reaction parts 3 through the connection parts 4. The fluids are then let flow out through the opening portions 5.

FIG. 1A is a plan view showing the silicon wafer 1 in which the grooves are formed. The grooves can be formed by transferring a pattern onto a silicon wafer by photolithography, and by etching the wafer with a mixed solution of fydrofluoric acid, nitric acid and acetic acid. For example, the high-density capillary array for reaction and detection of fluid according to the present invention can be manufactured as follows. At first, etching is performed on the silicon wafer as a lower substrate 2 in accordance with the pattern shown in FIG. 1A. Thereafter, an upper substrate 6 with opening portions 5 formed therein is joined to the silicon wafer 2. More specifically, for example, etching to a depth of 0.1 mm is performed on the silicon wafer 2 having a thickness of 0.5 mm in accordance with the pattern shown in FIG. 1A, thereby to form grooves. Subsequently, a thin light-transmissible plate as an upper substrate 6 with desired opening portions 5 formed therein, which has a thickness of 0.5 mm, for example, is anodally joined thereto(i.e. by anodic bonding). The capillary array can thus be manufactured. In this manner, it is possible to manufacture reaction vessels each having at least one light-transmissible surface. For example, the size of the silicon wafer ranges from about 25 mm to about 125 mm in diameter, and the depth of the grooves may be about 0.05 to about 0.4 mm. The width of each groove may be about 0.05 mm to about 5 mm.

The high-density capillary array for reaction and detection of fluid according to the present invention can be created by forming grooves in a lower substrate and by joining thereto a light-transmissible upper substrate by means of an adhesion, heat fusion, or the like. Otherwise, the high-density capillary array for reaction and detection of fluid according to the present invention can be created by irradiating an excimer laser on a light-transmissible substrate to form hollow tubes.

In the apparatus according to the present invention, a DNA probe or the like may be provided inside the reaction part 3 before joining the lower substrate 2 and the upper substrate 6.

Figure 1C:
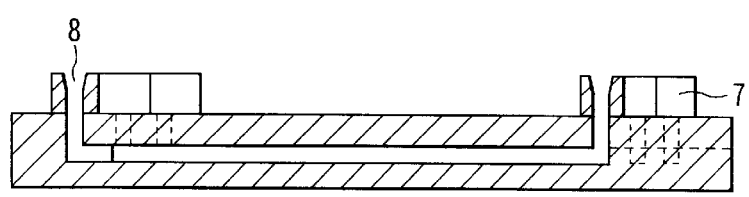

Also, as shown in FIG. 1C, auxiliary parts 7 may be constructed above the opening portions 5. In this manner, the total volume of the capillaries can be adjusted. More easier inflow and outflow of liquids can be achieved by forming tapers 8.

If the opening portions 5 are inflow ports and the opening portions 5' are outflow ports, the positions of the inflow and outflow ports can be arbitrarily determined by adjusting the lengths of the connection parts 4 and 4' and the extent of bending. For example, 24 inflow ports may be arrayed as components of a matrix consisting of rows and columns at the part 9 surrounded by a broken line, as shown in FIG. 1A. The interval between the inflow ports may be set to a distance which matches with the pitch of pipettes of a multiple pipette, e.g., 9 mm. The present apparatus then becomes advantageous for use with a multiple pipette. In addition, a pair of inflow and outflow ports which are comprised in each capillary and which are respectively included in the matrix constructed by 24 inflow ports included in the part 9 surrounded by a broken line and another matrix of 24 outflow ports included in another part 9' surrounded by a broken line should be arranged such that their positions in the corresponding matrixes are equal to each other. For example, it is preferable that an inflow port 10 and an outflow port 10' are arranged at an equal position in each of the matrixes (FIG. 1A). By this arrangement, the multiple pipette can be used more effectively.

For example, in case of injecting reaction liquids with use of a multiple pipette, the liquids injected from the inflow ports 5 flow through the connection part 4, reaction part 3, and connection part 4', and are then discharged from the outflow ports 5' (FIG. 1B). The positions of the inflow and outflow ports included in each capillary are equal to each other in the corresponding matrixes. Therefore, the tip of a multiple pipette used for an inflow operation need not be replaced or cleaned but can be directly used for the outflow ports of the surrounded part 9' if a multiple pipette capable of injecting liquids into all of the inflow ports in the surrounded part 9 in FIG. 1A and if the tip need not be cleaned or replaced between an inflow operation and an outflow operation. Accordingly, liquids can be added from inflow ports comprised in capillaries and can be suctioned out of outlet ports also comprised in the same capillaries, respectively, without paying specific attention. In addition, a predetermined number of outflow ports are arrayed in each of columns disposed along the capillary direction, e.g., outflow ports are arrayed in a matrix of 8 rows×3 columns. Therefore, processing in a large number of capillaries can be carried out efficiently without changing the interval between multiple pipettes.

Each of the above-described structures of the present invention can be variously changed and modified. For example, the width of the reaction part 3 is designed to be greater than the width of the connection parts, in the embodiment shown in FIG. 1A. However, the width of the connection parts may be greater than or equal to that of the reaction part. The shapes of the inflow and outflow ports may be circular or rectangular. The grooves may be linear narrow grooves or grooves whose cross sections are defined by polygonal and/or closed curves. In addition, the cross sections of the capillaries in the present apparatus may be rectangular or circular. The width and/or depth of the capillaries in the present apparatus may be constant or may differ throughout the whole length including the reaction part 3 and the connection parts 4 and 4'. Further, the width and/or depth may be equal or may differ between the plurality of fluid processing capillaries comprised in the present high-density capillary array for reaction and detection of fluid. The shapes of the opening portions may be circular or rectangular.

Embodiment 2

Figure 2A:
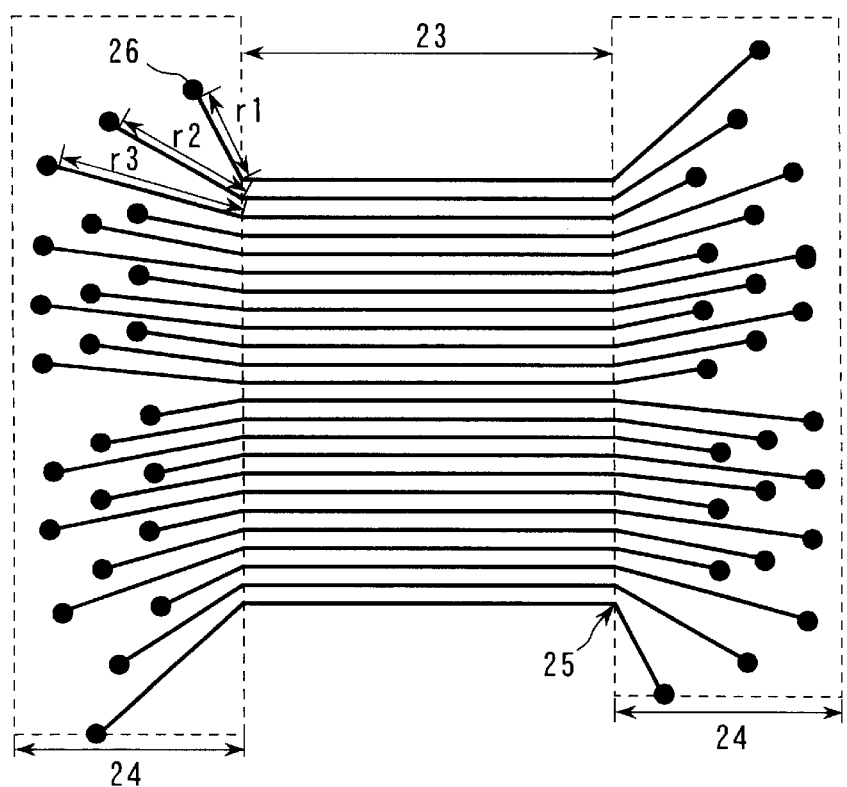
FIG. 2A is a plan view showing a high-density capillary array for reaction and detection of fluid according to a second preferred embodiment.

A high-density capillary array for reaction and detection of fluid according to the embodiment 2 is manufactured in the same manner as that taken in the embodiment 1 except that the pattern of capillaries is arranged as shown in FIG. 2A. According to the pattern of the embodiment 2, capillaries are constructed by reaction parts 23, connection parts 24, and opening ports indicated by marks of black circles. In the reaction parts 23, all capillaries have an equal volume. Also, the capillaries are respectively bent at points 25 in the connection parts 24. The distances from the points 25 to the opening portions 26 are constant so that the opening portions 25 are respectively positioned on circumferences about the points 25 as their centers.

Figure 2B:
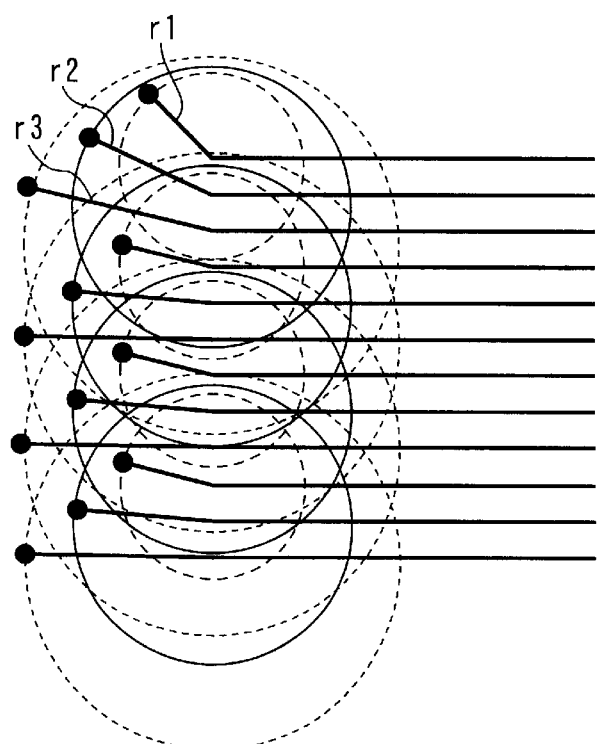
FIG. 2B is a enlarged segmentary view of the second preferred embodiment.

Explained now will be an application example in case of arranging capillaries in three columns. Suppose that the distance from each point 25 to its corresponding opening portion 26 is expressed by a radius r, and radiuses $r_1$, $r_2$, and $r_3$ of circles are assigned repeatedly to the capillaries, in the order from an end side, as shown in FIG. 2B. The opening portions are respectively arranged on circumferences of circles with the points 25 of the connection part set as their centers such that the radiuses $r_1$, $r_2$, and $r_3$ satisfy an equation of $r_1+r_3=2\times r_2$. At this time, positioning of the opening portions is carried out such that, if the position of the opening portion at an end of the reaction part is determined by a circle having the radius $r_1$, the position of the opening portion at the other end of the same reaction part is determined by a circle having the radius $r_3$. Likewise, if the radius $r_2$ is taken at an end, the radius $r_2$ is taken at the other end. Also, if the radius $r_3$ is taken at an end, the radius $r_1$ is taken at the other end. Then, the positions of the opening portions can be changed while the lengths of all capillaries are maintained equal to each other. Similarly, opening portions can be positioned on circumferences about points 25 as centers which satisfy an equation of $r_1+r_4=r_2+r_3$, where the opening portions are arrayed in four columns, diameters $r_1$, $r_2$, $r_3$, and $r_4$ are assigned in the order from an end of the reaction part, and the lengths are defined by a relationship of $r_1>r_2>r_3>r_4$. Positioning in an arbitrary number of columns can be considered in accordance with the manner of thinking as described above.

Embodiment 3

Figure 3:
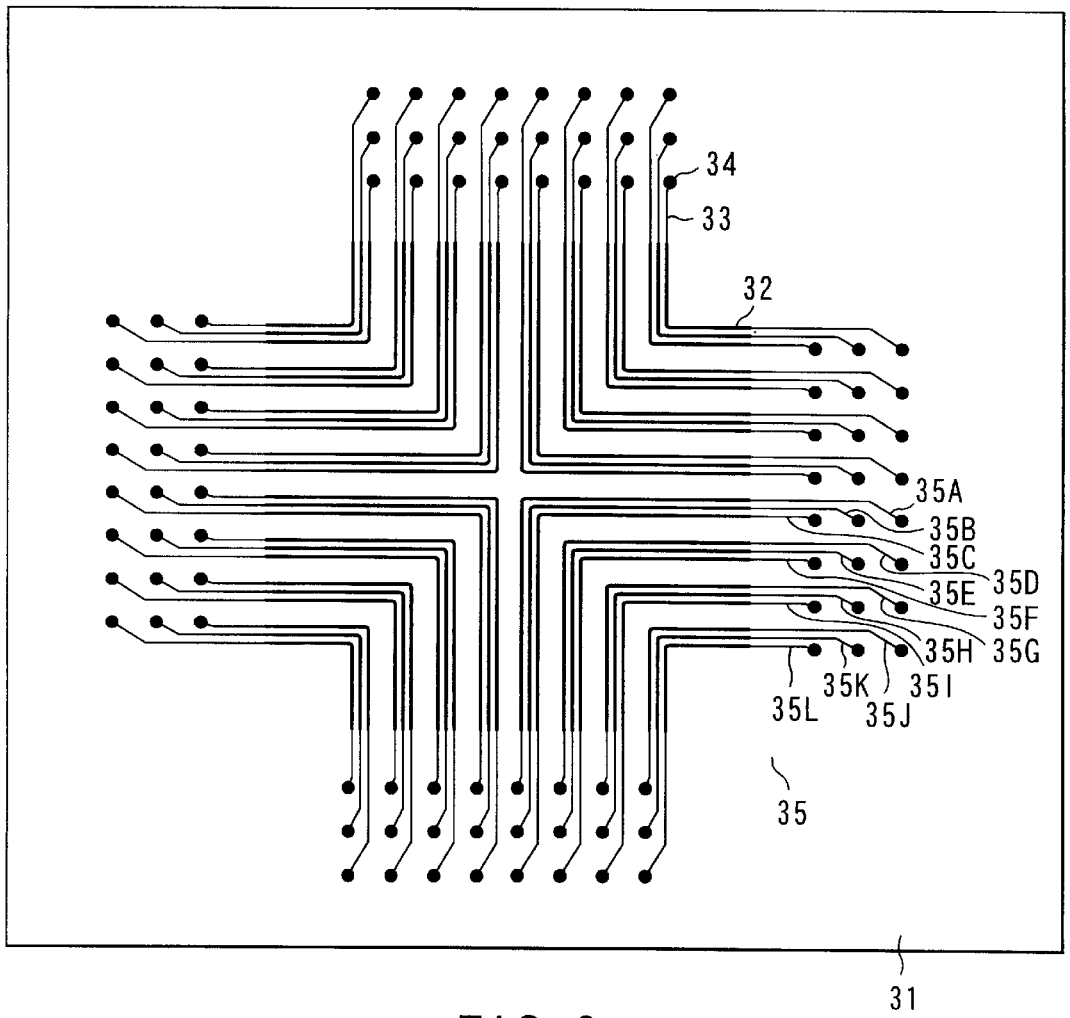
FIG. 3 is a plan view showing a high-density capillary array for reaction and detection of fluid according to a third preferred embodiment.

A high-density capillary array for reaction and detection of fluid according to the embodiment 3 is manufactured in the same manner as that taken in the embodiment 1 except that the pattern of capillaries is arranged as shown in FIG. 3.

Capillaries comprised in the high-density capillary array for reaction and detection of fluid according to the embodiment 3 are each bent at approximately right angles in the reaction parts 32. In compliance with the shape, a plurality of fluid processing capillaries are arrayed in parallel. A group 35 is constructed by twelve capillaries 35A to 35L. Four groups 35 are arranged such that corner parts of the capillaries face each other between the groups. In this manner, it is possible to integrate reaction parts of the vessels at a high density closer to the center. Thus it is possible to manage effectively reaction conditions in a plurality of reaction parts 32. This is also suitable for observation based on scanning by a detector. That is, a detector needs only to scan a narrower range. For example, this structure is advantageous in the case of making a detection in which a DNA probe is immobilized at a reaction part of the high-density capillary array for reaction and the detection of fluid and target DNA labeled by a fluorescent material in a sample is connected with the DNA probe.

Also, in the present embodiment, opening portions 34 are provided at both ends of a capillary each comprising a reaction part 32 and connection parts 33, and the reaction parts 32 are bent. The capillaries are provided with bent corner parts face each other. In this manner, the opening portions 34 are arranged outside the reaction parts 32. The opening portions 34 are formed in the upper substrate such that the opening portions 34 are continuous to the connection parts 33. Therefore, the positions of the opening portions 34 can be arbitrarily determined by adjusting the lengths and bending of the connection parts 33. By bending the reaction parts 32 as shown in FIG. 3, the reaction parts 32 are positioned closer to the center of the apparatus and the opening portions 34 are positioned closer to the periphery of the apparatus. It is therefore possible to provide a large number of opening portions 34 with a desired interval maintained therebetween. As a result, a large number of fluid processing capillaries can be arranged in a small area.

Figure 4:
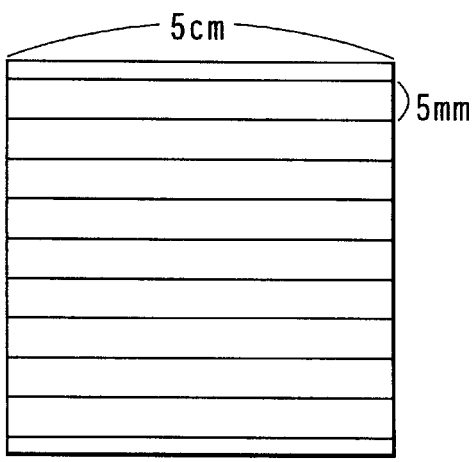
FIG. 4 is a view showing a preferred layout pattern of the capillary array.
Figure 5:
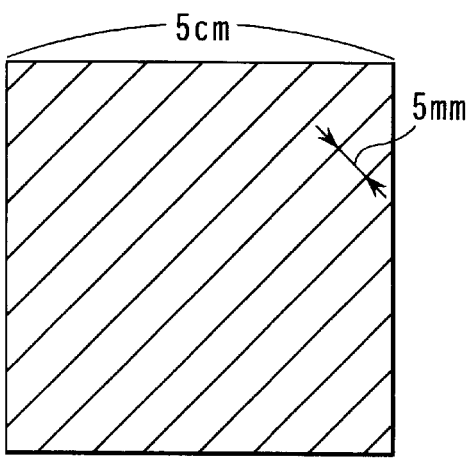
FIG. 5 is a view showing a preferred layout pattern of the capillary array.
Figure 6:
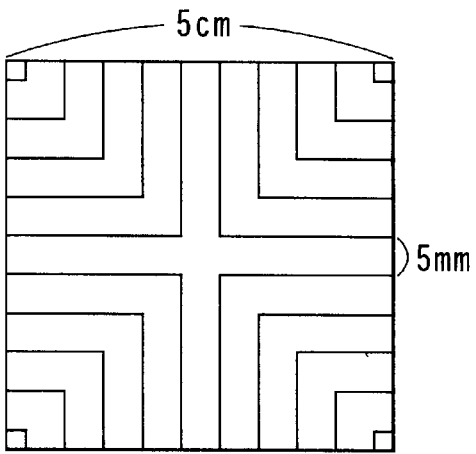
FIG. 6 is a view showing a preferred layout pattern of the capillary array.
Figure 7:
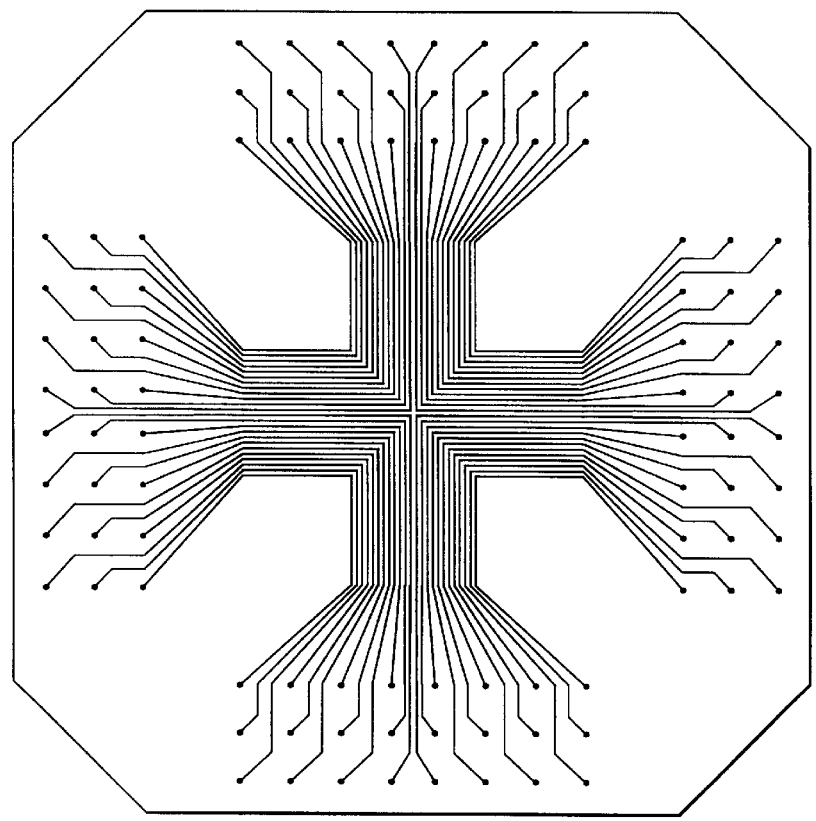
FIG. 7 is a plan view showing a high-density capillary array for reaction and detection of fluid according to a fourth preferred embodiment.
Figure 8:
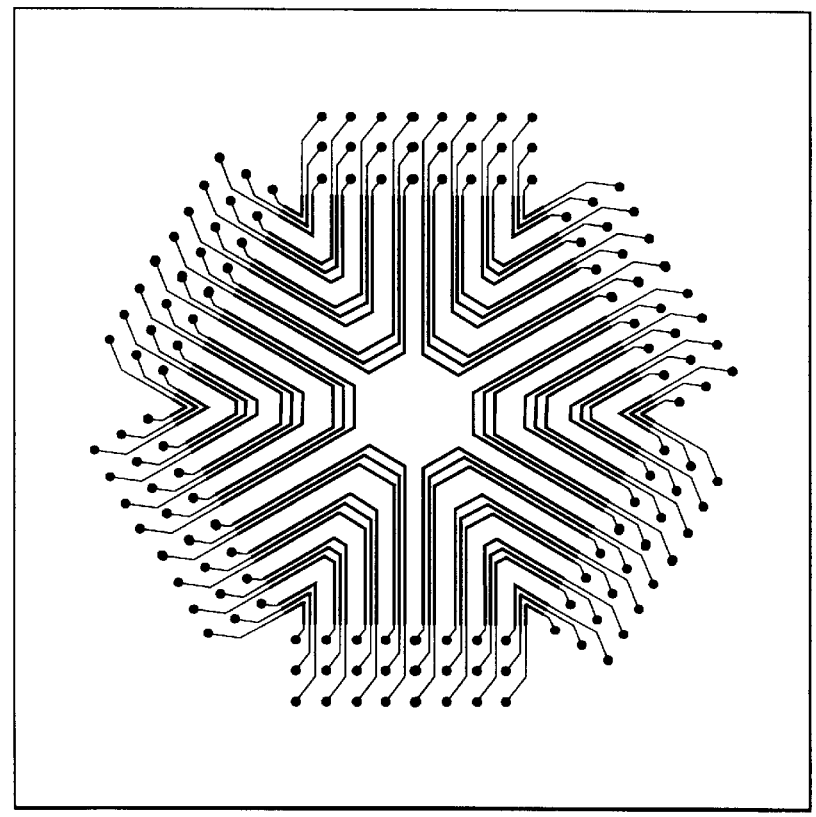
FIG. 8 is a plan view showing a high-density capillary array for reaction and detection of fluid according to a fifth preferred embodiment.
Figure 9:
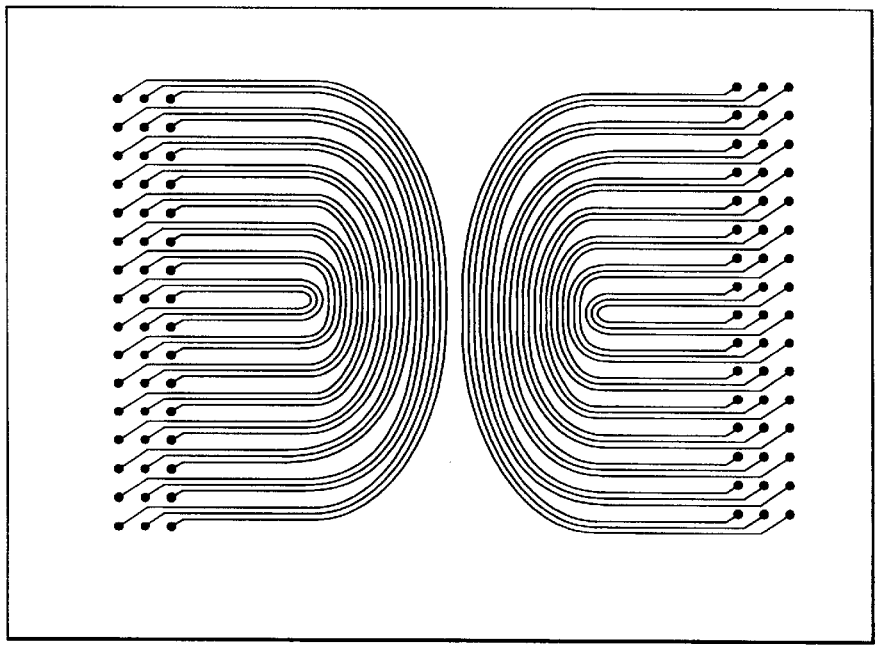
FIG. 9 is a plan view showing a high-density capillary array for reaction and detection of fluid according to a sixth preferred embodiment.

With reference to FIGS. 4, 5, and 6, the following will explain advantages of the structure in which reaction parts are bent. FIGS. 4 to 6 each show how many reaction parts can be arranged in a square of 5 cm×5 cm. The interval between reaction parts is 5 mm. FIG. 4 is a schematic view showing the case where a plurality of fluid processing capillaries are arranged in parallel to an edge of the square. FIG. 5 is a schematic view showing the case where reaction parts are not bent but are arranged at an angle of 45° to an edge of the square. FIG. 6 is a schematic view showing the case where reaction parts are bent at an angle of 90° and are arranged such that their bending corner parts face each other. Table 1 shows the number of reaction parts which can be arrayed in each of the cases. As shown in the table 1, without changing the area of the square, the number of reaction parts can be increased by bending the reaction parts. Accordingly, the layout adopted in the apparatus according to the present invention is capable of arraying a greater number of fluid processing capillaries in one same area than in a conventional apparatus.

TABLE 1

|        | Number of reaction parts | Total length (mm) |
|--------|--------------------------|-------------------|
| FIG. 4 | 10                       | 500               |
| FIG. 5 | 14                       | 497               |
| FIG. 6 | 20                       | 500               |

The bending angle of the reaction parts is preferably set to such an angle that does not hinder the flow of liquid and does not cause clogging. In addition, the above-described structure is suitable for optical observation. Although manufacture of the present apparatus is facilitated by maintaining the depth and/or width of the grooves constructing the fluid processing capillaries to be constant, use of the structure is not limited thereto.

The width or thickness of each fluid processing capillary and the distance between the fluid processing capillaries can be selected depending on optical detection limits, processing precision, viscosity of fluid to be used, and materials of the present apparatus.

Any of three different widths is selected as the width of each connection part in compliance with the length of a corresponding fluid processing capillary, although not shown in FIG. 3. That is, the three different widths are a maximum width, a half of the maximum width, and a half of the half of the maximum width. When the pattern shown in FIG. 3 is obtained by etching, the depth of the grooves is substantially equal throughout the entire area. Therefore, the volume of each fluid processing capillary increases or decreases depending on the width of its groove. Table 2 shows differences in volume between fluid processing capillaries in case where the pattern shown in FIG. 3 is etched without adjustment of groove widths and fluid processing capillaries in case where groove widths are corrected by adjustment. The high-density capillary array for reaction and detection of fluid used herein was prepared as follows. That is, a silicon wafer having a diameter of about 10 cm and a thickness of 0.5 mm was used as a lower substrate, and grooves having a depth of 0.1 mm were formed by etching. A Pyrex glass plate having a thickness of 0.5 mm is anodally joined thereto as an upper substrate. As is apparent from the table, the volumes of the fluid processing capillaries differ variously from each other before correction. After correction, however, the volumes are adjusted to a substantially equal value. Accordingly, it is possible to prevent shortage or leakage of liquids which are caused when injecting and suctioning liquids in case of using a multiple pipette.

TABLE 2

| Capillary No. | Total length | Volume (µL) | Volume after correction (µL) |
|---|---|---|---|
| 35A | 80.2 | 4.01 | 3.24 |
| 35B | 78.2 | 3.91 | 3.14 |
| 35C | 76.2 | 3.81 | 3.08 |
| 35D | 70.2 | 3.51 | 3.08 |
| 35E | 68.2 | 3.41 | 3.08 |
| 35F | 66.2 | 3.31 | 3.08 |
| 35G | 60.2 | 3.01 | 3.08 |
| 35H | 58.2 | 2.91 | 3.08 |
| 35I | 56.2 | 2.81 | 3.08 |
| 35J | 50.2 | 2.51 | 3.08 |
| 35K | 48.2 | 2.41 | 3.08 |
| 35L | 46.2 | 2.31 | 3.08 |

In each of the embodiments described above, a silicon wafer is used as a lower substrate. However, the substrate is not limited thereto but injection-molded plastics, quartz glass, or the like may be used, for example. The thickness of the lower substrate needs only to be enough to form grooves of about 0.05 mm to about 1 mm. In addition, at least one surface of the present apparatus should preferably be light-transmissible in order to make optical observation.

As described above, the high-density capillary array for reaction and detection of fluid according to the present invention can be created by forming grooves in a lower substrate and by joining a light-transmissible upper substrate by an adhesion or thermal fusion, for example. Otherwise, the fluid processing capillaries according to the present invention can be created by irradiating an excimer laser onto a light-transmissible substrate thereby to form hollow tubes.

In addition, the width and/or depth of the fluid processing capillaries in the present apparatus may be constant or may differ throughout the whole length including the reaction parts, connection parts, and end parts. Further, the width and/or depth may be equal or may differ between the plurality of fluid processing capillaries comprised in the present high-density capillary array for reaction and detection of fluid. The shapes of the opening portions may be circular or rectangular. Further, the reaction parts may be constructed by linear or curved tubes or may be those tubes whose cross sections are each surrounded by a polygon and/or a closed curve.

Embodiments 4 to 7

The structure of the present apparatus can be variously changed and modified. For example, the array pattern of fluid processing capillaries according to the present apparatus may be any of patterns shown in FIGS. 7 to 10 (FIGS. 7 to 10). The fluid processing capillaries having any of these patterns can be manufactured in the same manner as that of the embodiment 1 except that the capillaries have a pattern shown in any of FIGS. 7 to 10. The size and other functions of the apparatus can be set under the same conditions as described in the embodiments 1 to 6.

Figure 10:
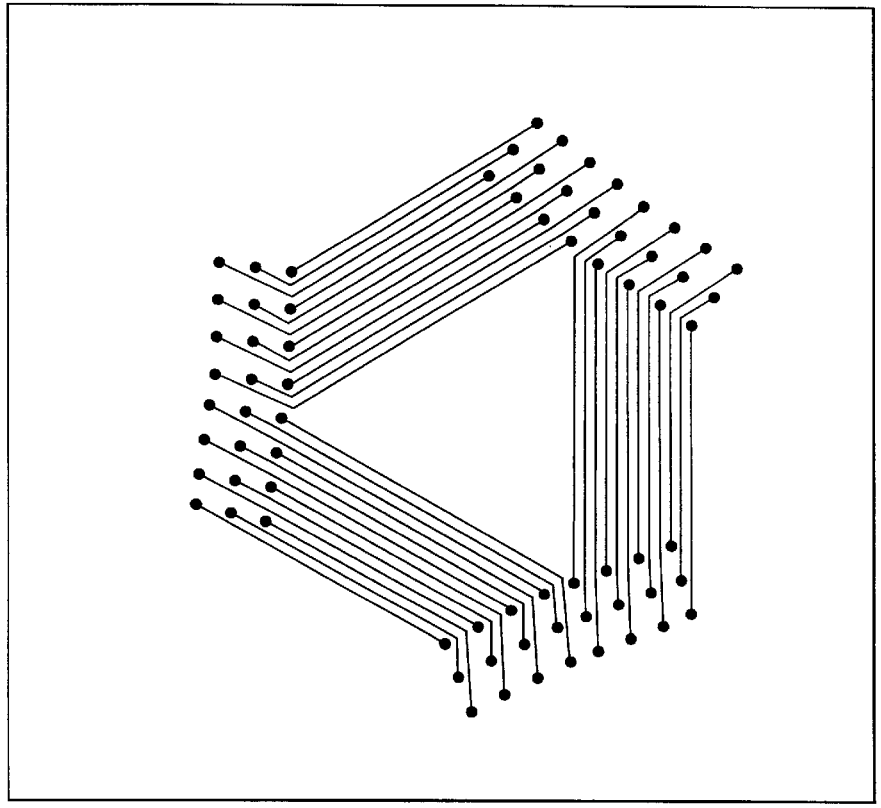
FIG. 10 is a plan view showing a high-density capillary array for reaction and detection of fluid according to a seventh preferred embodiment.

Also, the structure of the present apparatus can be variously changed and modified. For example, the array pattern of the fluid processing capillaries according to the present apparatus may have a structure in which the reaction parts are not bent (FIG. 10). In addition, the bending angle of the reaction parts may be changed to a different angle with respect to FIGS. 7 to 9, and the number of times for which the reaction parts are bent may be changed. Further, the reaction parts may be bent to be smoothly curved or angularly cornered.

For example, as shown in FIG. 1A, in case where the reaction parts are not bent, the volumes of capillaries can be equalized to each other by arranging the whole length including connection parts and a reaction part to be equal between the capillaries. In addition, it is possible to change not only the width of the connection parts, as described above, but also the width of each reaction part or the area of the figure constructing each reaction part. Also, the volume can be changed by changing the depth of each groove. For example, in order to change partially the depth of each groove in case where a silicon wafer is subjected to etching process or the like to manufacture the present apparatus, another part than the part which should be etched more deeply is protected with a nitride film after etching for the first time, and etching is carried out for the second time. In this manner, the part which is not protected is etched more deeply, so that both deep and shallow grooves can be formed.

Embodiment 8

An embodiment 8 as a preferred embodiment of the present invention will be explained below with reference to FIGS. 11A to 11D. In the embodiment 8, two high-density capillary arrays for reaction and detection of fluid are prepared and layered vertically. However, the two arrays are layered such that the fluid processing capillaries in the upper array and those in the lower array might not overlap each other.

The embodiment 7 can be manufactured while three members shown in FIGS. 11A to 11D are layered on each other. The members 51, 57, and 59 shown in FIGS. 11A, 11B, and 11C are respectively layered as upper, middle, and lower layers and are joined to each other. Further, a light-transmissible top layer (not shown) is joined to the upper part of the member 51. Reaction parts 52, connection parts 53, and end parts 54 of the connection parts are formed in the member 51, and opening portions are formed at positions right above the end parts 54 in the top layer. Fluids which are let flow in from the opening portions corresponding to the ends 55 of the connection parts flow into the reaction parts 60 of the member 59 through holes 58 formed in the member 57. The fluids which thus flow in are let flow out through the other ends of the reaction parts 60 in a similar manner.

The layers can be joined to each other by printing an epoxy-resin-based adhesion or the like by screen printing. Since two groups of reaction parts are thus respectively constructed in different layers, the interval between the reaction parts can be reduced to zero. In this manner, the volume can be increased without changing the size of the entire apparatus.

The structure thus comprising multiple layers can be applied to any of other layout patterns. For example, two high-density capillary arrays for reaction and detection of fluid each having a pattern shown in FIG. 1A may be prepared and used as upper and lower layers.

The embodiments described above are each arranged such that all the end parts are shifted along the capillaries for every three end parts. However, the end parts may be shifted for every two or more end parts, in compliance with the number of required capillaries and the shape or size of a required substrate. The degree of freedom can then be improved in design.

Example

An application example of a high-density capillary array for reaction and detection of fluid according to the present invention will be explained below. The high-density capillary array for reaction and detection of fluid according to the present invention is applicable to various reactions using micro amounts of samples, if the array is used together with a high-voltage power source and a platinum electrode or an external heat source. For example, if samples are liquids, it is possible to cause reactions such as electrophoresis of the samples, detection and separation of an aimed material contained in the samples, a polymerase chain reaction (PCR) and an antigen-antibody reaction, and the like. However, the application use is not limited thereto.

An example of using the present invention as a DNA capillary array will now be explained. A silicon substrate having a square of a width of 75 mm is used and set. In accordance with the layout pattern shown in FIG. 7, 48 capillaries each having a diameter of about 100 $\mu$m are provided at a pitch of 2 capillaries per 1 mm. In addition, about 200 DNA probes per capillary can be included in the reaction part of about 4 cm.

In addition, the high-density capillary array for reaction and detection of fluid according to the present invention may be alternatively named a reaction vessel array, a reaction tube array, a detection tube array, a separation tube array, an electrophoresis tube array, or the like in accordance with the application purpose. Then, the fluid processing capillaries comprised in the array may be named reaction vessels, reaction tubes, detection tubes, separation tubes, electrophoresis tubes, or the like in accordance with the case. Further, if gases are used as samples in the high-density capillary array for reaction and detection of fluid according to the present invention, for example, a blood gas can be detected or quantitatively determined by providing a sensor at the reaction part. The present invention, however, is not limited thereto.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A high-density capillary array for reaction and detection of fluid, comprising a plurality of fluid processing capillaries arranged in parallel on one same plane, the fluid processing capillaries each comprising:

a reaction part for performing processing on fluid, wherein DNA probes are provided in the reaction part;

connection parts connected to each end portion of the reaction part; and opening portions provided at ends of the connection parts, for allowing the fluid to flow into and out of the reaction part;

wherein each of the fluid processing capillaries is bent at portions between the reaction part and the connection parts.

2. The array according to claim 1, wherein each of the fluid processing capillaries has a volume has a volume within a range of ±10% of an average volume of all the fluid processing capillaries.

3. A high-density capillary array for reaction and detection of fluid, comprising a plurality of groups of fluid processing capillaries arranged on one same plane, the fluid processing capillaries each comprising:

a reaction part for performing processing on fluid, wherein DNA probes are provided in the reaction part;

connection parts connected to each end portion of the reaction part; and opening portions provided at ends of the connection parts, for allowing the fluid to flow into and out of the reaction part;

wherein the capillaries which form a same group are disposed in parallel to each other, and at least one portion of each capillary is bent in the reaction part to form a convex corner portion; and different capillary groups are arranged such that the convex corner portion of an outermost capillary of one group confronts the convex corner portion of an outermost capillary of another group.

4. The array according to claim 3, wherein each of the fluid processing capillaries has a volume has a volume within a range of ±10% of an average volume of all the fluid processing capillaries.

5. A high-density capillary array for reaction and detection of fluid, comprising a plurality of fluid processing capillaries arranged in parallel on one same plane, the fluid processing capillaries each comprising:

a reaction part for performing processing on fluid, wherein DNA probes are provided in the reaction part;

connection parts connected to each end portion of the reaction part;

an inflow part formed at an end of one of the connection parts, for allowing the fluid to flow into the reaction part; and an outflow part formed at an end of the other one of the connection parts, for allowing the fluid to flow into the reaction part;

wherein the inflow parts are arranged as components constructing a matrix of the inflow parts, as well as the outflow parts are arranged as components constructing a matrix of the outflow parts, and the inflow and outflow parts of each of the fluid processing capillaries are provided at equal positions in the corresponding matrixes, respectively.

6. The array according to claim 5, wherein each of the fluid processing capillaries has a volume has a volume within a range of ±10% of an average volume of all the fluid processing capillaries.

7. A high-density capillary array for reaction and detection of fluid, comprising a plurality of groups of fluid processing capillaries arranged in parallel on one same plane, the fluid processing capillaries each comprising:

a reaction part for performing processing on fluid, wherein DNA probes are provided in the reaction part;

connection parts connected to each end portion of the reaction part;

an inflow part formed at an end of one of the connection parts, for allowing the fluid to flow into the reaction part; and an outflow part formed at an end of the other one of the connection parts, for allowing the fluid to flow into the reaction part;

wherein the capillaries which form a same group are disposed in parallel to each other, and at least one portion of each capillary is bent in the reaction part to form a convex corner portion;

different capillary groups are arranged such that the convex corner portion of an outermost capillary of one group confronts the convex corner portion of an outermost capillary of another group; and the inflow parts are arranged as components constructing a matrix of the inflow parts, as well as the outflow parts as components constructing a matrix of the outflow parts, and the inflow and outflow parts of each of the different fluid processing capillaries are provided at equal positions in the corresponding matrixes, respectively.

8. The array according to claim 7, wherein each of the fluid processing capillaries has a volume has a volume within a range of ±10% of an average volume of all the fluid processing capillaries.

* * * * *